United States Patent

[11] 3,627,613

| [72] | Inventor | Thomas J. Stolki<br>Wilbraham, Mass. |
|---|---|---|
| [21] | Appl. No. | 827,274 |
| [22] | Filed | May 23, 1969 |
| [45] | Patented | Dec. 14, 1971 |
| [73] | Assignee | Monsanto Company<br>St. Louis, Mo. |

[54] CONTINUOUS PROCESS FOR PREPARING COMPOSITES IN SHEET FORM
4 Claims, 3 Drawing Figs.

[52] U.S. Cl. .................................................. 156/309,
161/94
[51] Int. Cl. .................................................. C09j 5/00
[50] Field of Search ....................................... 156/306,
309; 161/94–96

[56] References Cited
UNITED STATES PATENTS

| 2,719,100 | 9/1955 | Banigan | 156/309 |
| 3,003,903 | 10/1961 | Vaughan | 156/309 |
| 3,030,255 | 4/1962 | Winston | 161/95 |
| 3,234,668 | 2/1966 | Radcliffe | 161/94 UX |
| 3,264,166 | 8/1966 | Lowery | 161/95 X |
| 3,493,451 | 2/1970 | Beery | 161/96 X |

FOREIGN PATENTS

| 125,566 | 5/1949 | Sweden | 156/309 |
| 1,078,041 | 5/1954 | France | 156/309 |

*Primary Examiner*—Reuben Epstein
*Attorneys*—John W. Klooster, Arthur E. Hoffman and Russell H. Schlattman ABSTRACT: A continuous process for preparing composites in sheet form by laminating together through a metallic interlayer two sheets each of a rubber-modified interpolymer system of monovinyl aromatic compound. A product composite can have more than one interlayer in a matrix, depending on the number of sheets and interlayer members employed in practicing the process.

PATENTED DEC 14 1971 3,627,613

INVENTOR
THOMAS J. STOLKI

BY JOHN W. KLOOSTER,
ARTHUR E. HOFFMAN,
RUSSELL H. SCHLATTMAN

ATTORNEYS

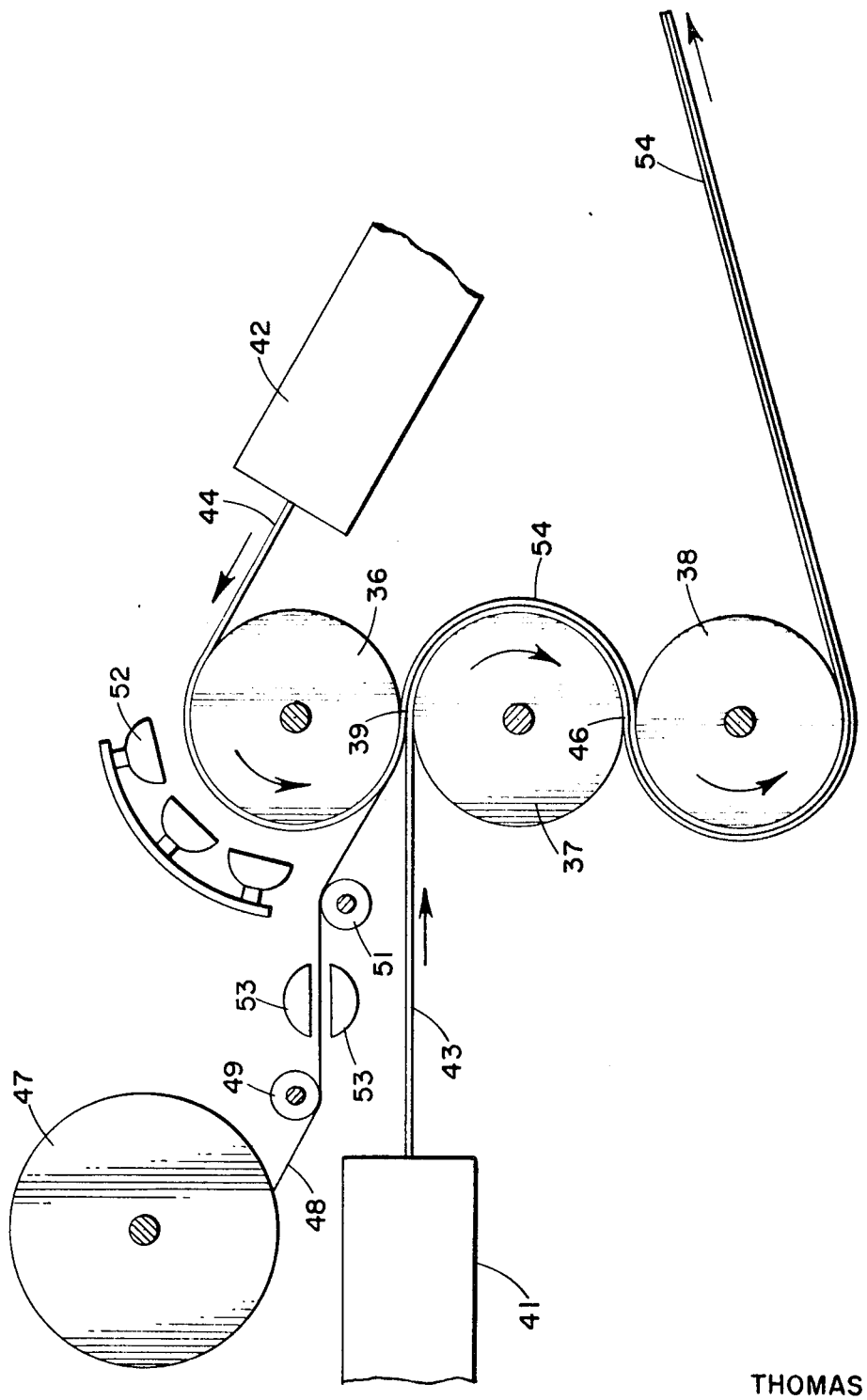

CONTINUOUS PROCESS FOR PREPARING COMPOSITES IN SHEET FORM

BACKGROUND

Although it has heretofore been proposed to embed a preformed wire meshlike structure in a thermoplastic (see U.S. Pat. No. 3,030,255) layer, so far as I am aware, there has not heretofore been available any method for commercially manufacturing thermoplastic sheet members with a wire meshlike structure embedded therewithin, particularly when the thermoplastic material is a rubber-modified interpolymer system of monovinyl aromatic compound. Such as interpolymer system does not flow under atmospheric conditions in a liquid form when heated to elevated temperatures; such a system characteristically heat softens only, and tends to decompose rather than liquify under such conditions. It is generally insufficient in the case of such interpolymer systems merely to rest a sheet of such an interpolymer system over a wire mesh and then heat the assembly to a temperature such that the plastic simply oozes and flows downwardly to envelop the plastic mesh, as taught in the aforeindicated U.S. patent.

While I have learned through experimentation that one can prepare by lamination in a batchlike manner a composite in which the matrix layer is such a rubber-modified interpolymer system of monovinyl aromatic compound having embedded therewithin a wire meshlike structure (the technique here being to apply appropriate heat and pressure to a stack of alternate layers of interpolymer system sheets and interlayer members), such a batch technique of preparation is generally unsuitable for commercial production of such composites One reason is that such batch lamination requires appreciable times for heat applied to opposing faces of a sandwich or deck of components to penetrate such to a depth, and to a degree of uniformity, that the component layer comprising the deck are heated to temperatures sufficient to permit the interpolymer system sheet members thereof to flow through the interlayers thereof and cause the whole to be fused together into the desired composite monolithic structure. The times are so excessive, sometimes being of the order of 30 minutes or more even using temperatures sufficient to soften the interpolymer systems involved that commercial rates of production are generally not feasible.

Furthermore, such a gradual heating process causes thermal gradients to be set up in such a sandwich or deck which can and do result in a certain migration of material within a given interpolymer system sheet so that the initial properties thereof, such as strength and impact resistance can be rather drastically altered during fusion to form a composite.

In addition, such essentially gradual and sustained heating to and at elevated temperatures, can cause an undesired partial decomposition of certain types of additives which may be present in such an interpolymer system, such as, for example, flame retardants. Thus, a flame retardant commonly function by partially decomposing in the presence of heat to liberate materials which smother or prevent flame propagation in a plastic. Premature or undesired excessive processing heats can cause such a partial decomposition of such materials producing undesireable side effects, especially discoloration of the interpolymer system.

SUMMARY

The present invention is directed to a continuous process for preparing a sheetlike composite having matrix layers and interlayers embedded therein.

As starting materials, the process employs continuous sheets of a rubber-modified interpolymer system of monovinyl aromatic compound. These sheets are characterized by having a transverse average thickness ranging from about 0.007 inch to 0.250 inch; a tensile modulus of elasticity of from about 150,000 to 600,000 pounds per square inch at 73° F.; a tensile elongation to fail of at least about 5 percent at 73° F.; and an impact strength of from about 15 to 200 ft.-lbs. falling dart (at 0.1 inch thickness at 73° F.).

Also as starting materials, the process of the present invention employs preferably continuous metal layers characterized by having a transverse average thickness ranging from about 1 to 85 percent of the total combined average thickness of said sheets; and generally continuously, generally elongated metal portions with open spaces defined therebetween, the interrelationship between such metal portions and such open spaces being such that from about 5 to 70 weight percent of such interlayer comprises substantially solid (nonporous) metal portions.

In the practice of the invention, one separately heats both at least two preformed, continuously extending sheets of such rubber-modified interpolymer system of monovinyl aromatic compound, as such sheets continuously advance and at least one preformed metal layer as such continuously advances. These preheated respective members are continuously brought together into face-to-face engagement one with the other in such a way that, between each adjacent pair of sheets of interpolymer system, there is a single metal layer. The metal layer is chosen and positioned so as to be generally coextensive with the interpolymer system sheet members (except possibly at extreme edge regions). As the respective members are brought together thusly, there is simultaneously continuously applied thereto at least sufficient pressure to cause the respective so-heated adjacent sheets of interpolymer system to flow into and through the metal layer and to coalesce together at points of contact with one another thereby to form the desired continuous matrix layer having embedded therewithin the indicated metallic interlayer so as to produced the wanted product composites.

For purposes of this invention, the term "sheetlike" has reference to sheets, films, tubes, extrusion profiles, discs, cones, and the like, all generally having wall thicknesses corresponding to the thickness of the matrix layer. Those skilled in the art will appreciate that under certain circumstances, three-dimensional sheetlike composites of the invention may, without departing from the spirit and scope of this invention, in effect be filled with some material. In general, a sheetlike composite of the invention is self-supporting, that is, it exists in the air room conditions without the need for a separate solid supporting member in face-to-face engagement therewith in order to maintain the structural integrity thereof without composite deterioration (as through splitting, cracking, or the like).

For purposes of this invention, tensile modulus of elasticity, tensile elongated to fail, flexibility, and the like, are each conveniently measured (using ASTM Test Procedures or equivalent).

A suitable falling dart impact strength measurement test procedure is as follows: A falling dart drop testing apparatus like that described in ASTM D-1709-59T is used. The dart has a 1.5 inch diameter hemispherical head fitted with a 0.5 inch diameter steel shaft 8 inches long to accommodate removable weights. A pneumatic dart release mechanism is positioned so that the dart is dropped 26 inches onto the surface of the test specimen. The test specimen is clamped and help firmly between steel annular rings with an inside diameter of 5 inches. The clamping mechanism is aligned so that the dart strikes the center of the test specimen. The test specimens are preferably 6 inches by 6 inches flat plastic sheets. Specimen thicknesses should not deviate more than 5 percent from the nominal or average thickness. In a test, the specimen is placed in the clamping mechanism, and the dart is loaded with the weight at which 50 percent failure is expected. Then, the test specimen is impacted with the dart and examined for cracks (failure is designated by any crack in the specimen). A new specimen is used for each impact. In the event that the specimen fails (or does not fail), one decreases (or increase) the weight in increments of 0.25 pounds until the procedure produces a failure-nonfailure (or nonfailure-failure) sequence. The results are recorded and the test is preferably continued until at least 15 specimens have been thus tested.

The calculation procedure is as follows:

A. Record the number of impacts tested after the failure-nonfailure (or nonfailure-failure) point is reached (N), B. Add together the dart weights for the N impacts (W),
C. Divide W by N ($W_{50}$),
D. Multiply $W_{50}$ by the drop height (26 inches) to obtain the 50 percent fail falling dart impact ($F_5$).

To determine falling dart impact for composites of this invention, the following modified procedure may be used. The same dart drop testing apparatus as above is used, except that the dart has a 1-inch diameter hemispherical head and the test specimen is not clamped, but is placed on a flat, annular surface. Test specimens are preferably 4 inches by 4 inches flat composites. The procedure and calculations are described as above.

Starting Materials - Matrix Layer

In general, any semirigid solid plastic having the characteristics above described can be used as a matrix layer in the composite of this invention, as indicated above. As used herein, the terminology "rubber modified interpolymer system of monovinyl aromatic compound" has reference to:
A. A graft copolymer produced by polymerizing monovinyl aromatic compound in the presence of a preformed elastomer, and mixtures of such;
B. A graft copolymer produced by polymerizing monovinyl aromatic compound and at least one other monomer polymerizable therewith in the presence of a preformed elastomer, and mixtures of such; and
C. A mechanical mixture of (A) and/or (B) with optionally either monovinyl aromatic compound polymer, or a copolymer of monovinyl aromatic compound and at least one other monomer polymerizable therewith, or both, and mixtures of such.

As used herein, the term "monovinyl aromatic compound" has reference to styrene (preferred); alkyl-substituted styrenes, such as ortho-, meta-, and para-methyl styrenes, 2,4-dimethylstyrene, para-ethylstyrene p-t-butyl styrene, alpha-methyl styrene, alpha-methyl-p-methylstyrene, or the like; halogen substituted styrenes, such as ortho-, meta-, and para-chlorostyrenes, or bromostyrenes, 2,4-dichlorostyrene, or the like; mixed halo-alkyl-substituted styrenes, such as 2-methyl-4-chlorostyrene, and the like; vinyl naphthalenes; vinyl anthracenes; mixtures thereof; and the like. The alkyl substitutents generally have less than five carbon atoms per molecule, and may include isopropyl and isobutyl groups.

In general, such an interpolymer system has a number average molecular weight ($\overline{M}_n$) ranging from about 20,000 through 120,000, and the ratio of weight average molecular weight ($\overline{M}_w$) to number average molecular weight $\overline{M}_w/\overline{M}_n$ ranging from about 2 through 10.

In general, suitable elastomers for use in this invention can be saturated or unsaturated, and have a glass phase or second order transition temperature below about 0° C. (preferably below about −25° C.), as determined, for example, by ASTM Test D-746-52T, and have a Youngs Modulus of less than about 40,000 p.s.i. Examples of suitable elastomers include unsaturated elastomers such as homopolymers or copolymers of conjugated alkadienes (such as butadiene or isoprene), Where, in such copolymers, at least 50 percent thereof is the conjugated alkadiene; ethylene/propylene copolymers neoprene, butyl elastomers, and the like; and saturated elastomers such as as polyurethane, silicone rubbers, acrylic rubbers, halogenated polyolefins, and the like.

A preferred class of elastomers for use in this invention are diene polymer elastomers. Examples of diene polymer elastomers include, for example, natural rubber having isoprene linkages, polyisoprene, polybutadiene (preferably one produced using a lithium alkyl or Ziegler catalyst), styrene-butadiene copolymer elastomers, butadiene acrylonitrile copolymer elastomer, mixtures thereof, and the like. Such elastomers include homopolymers and interpolymers of conjugated 1,3-dienes with up to an equal amount by weight of one or more copolymerizable monoethylenically unsaturated monomers, such as monovinyl aromatic compounds; acrylonitrile, methacrylonitrile; alkyl acrylates (e.g., methyl acrylate, butyl acrylate, 2-ethylhexyl acrylate, etc.); the corresponding alkyl methacrylates, acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

A more preferred group of diene polymer elastomers are those consisting essentially of 75.0 to 100.0 percent by weight of butadiene and/or isoprene and up to 25.0 percent by weight of a monomer selected from the group consisting of monovinyl aromatic compounds and unsaturated nitriles (e.g., acrylonitrile, or mixtures thereof. Particularly advantageous elastomer substrates are butadiene homopolymer or an interpolymer of 90.0 to 95.0 percent by weight butadiene and 5.0 to 10.0 percent by weight of acrylonitrile or styrene.

Another preferred class of rubbers for the use of this invention are acrylic rubbers. Such a rubber may be formed from a polymerizable monomer mixture containing at least 40 weight percent of at least one acrylic monomer of the formula:

(1) 

where $R_3$ is a radical of the formula:
$$-C_pH_{2p+1})$$
and $P$ is a positive whole number of from 4 through 12.

Although the rubber may generally contain up to about 2.0 percent by weight of a cross-linking agent, based on the weight of the rubber-forming monomer or monomers, cross-linking may present problems in dissolving the rubber in monomers for a graft polymerization reaction (as when one makes an interpolymer system as described in more detail hereinafter). In addition, excessive cross-linking can result in loss of the rubber characteristics. The cross-linking linking agent can be any of the agents conventionally employed for cross-linking rubbers, e.g., divinyl-benzene, diallyl maleate, diallyl fumarate, diallyl adipate, allyl acrylate, allyl methacrylate, diacrylates and dimethacrylates of polyhydric alcohols, e.g. ethylene glycol dimethacrylate, etc.

One preferred class of monomers for copolymerizing with monovinyl aromatic compounds to produce interpolymer systems suitable for use in this invention as indicated above are alpha-electronegatively substituted ethers. Suitable such monomers are represented by the generic formula:

(2) 

where X is selected from the group consisting of —CN, —COOR$_2$, and —CONHR$_2$,
R$_1$ is selected from the group consisting of hydrogen, —(C$_n$H$_{2n+1}$), —(C$_n$H$_{2n}$) —CN, and —(C$_n$H$_{2n}$) —COOR$_2$,
R$_2$ is selected from the group consisting of hydrogen, and —(C$_m$H$_{2m+1}$),
$n$ is an integer of from 1 through 4, and
$m$ is an integer of from 1 through 8.

Suitable ethene nitrile compounds of formula (2) are especially preferred and include acrylonitrile (preferred), methacrylonitrile, ethacrylonitrile, 2,4-dicyanobtene-1, mixtures thereof, and the like.

Suitable acrylic compounds of formula (2) are especially preferred and include unsaturated acids such as acrylic acid and methacrylic acid; 2,4-dicarboxylic acid butene-1, unsaturated esters, such as alkyl acrylates (e.g., methyl acrylate, ethyl acrylate, butyl acrylate, octyl acrylate, etc.), and alkyl methacrylates (e.g., methyl methacrylate, ethyl methacrylate, butyl methacrylate, octyl methacrylate. etc.); unsaturated amides such as acrylamide, methacrylamide, N-butyl acrylamide, etc.; and the like.

Another preferred class of monomers for copolymerizing with monovinyl aromatic compounds as indicated above are conjugated alkadiene monomers. Suitable such monomers include butadiene, 3-butadiene1,3-butadiene 2-methyl-1,3-butadiene, piperylene chloroprene, mixtures thereof and the like; Conjugated 1,3-alkadienes are especially preferred.

Another preferred class monomers for copolymerizing with monovinyl aromatic compounds as indicated above are unsaturated esters of dicarboxylic acids, such as dialkyl maleates, or fumarates, and the like.

Considered as a whole, "other monomer polymerizable" with a monovinyl aromatic compound is commonly and preferably and ethylenically unsaturated monomer.

Optionally, a polymerization of monovinyl aromatic compound with at least one other monomer polymerizable therewith may be conducted in the presence of up to about 2 weight percent (based on total produce polymer weight) of a cross-linking agent such as a divinyl aromatic compound, such as divinyl benzene, or the like. Also optionally, such an interpolymer system may have chemically incorporated thereinto (as through polymerization) a small quantity, say less than about 2 weight percent (based on total polymer weight) of a chain n transfer agent, such as an unsaturated terpene (like terpinolene), and aliphatic mercaptan, a halogenated hydrocarbon, an alpha-methylstyrene dimer, or the like.

In any given rubber-modified interpolymer system of monovinyl aromatic compound used in this invention, there is typically present from about 50 to 98 weight percent of chemically combined monovinyl aromatic compound, from abut 0 to 48 weight percent of chemically combined other monomer polymerizable therewith and from about 2 to 50 weight percent elastomer, based on total interpolymer system weight. Preferably, in such a system, there are from 55 to 75 weight percent monovinyl aromatic compound; 5 to 45 weight percent other monomer polymerizable therewith, and from about 5 to 40 weight percent elastomer (same basis). Of course, any given matrix of such a system is chosen so as to have physical characteristics as above indicated. In the case of graft copolymers, and in the case of copolymers of monovinyl aromatic compound and at least one other monomer polymerizable therewith, preferably, the amount of chemically combined monovinyl aromatic compound ranges from about 50 to 85 weight percent and the amount of other monomer polymerizable therewith ranges from about 25 to 15 percent.

Preferred rubber modified interpolymer systems of monovinyl aromatic compounds are graft copolymers of Type (A) above. More preferred such graft copolymer are those of monovinyl aromatic compound, alpha-electronegatively substituted ethene onto preformed elastomer substrate such as polybutadiene; in such a polymer system, the amount of monovinyl aromatic compound typically ranges from about 20 to 95 weight percent (preferably from about 50 to 75 weight percent) while, correspondingly, the amount of chemically combined alpha-electronegatively substituted ethene ranges from about 80 to 5 percent (preferably from about 10 to 25 weight percent). In addition, the amount of chemically combined conjugated alkadiene monomer typical ranges up to about 25 weight percent and preferably from about 5 to 20 weight percent. Such a graft copolymer blend usually has a specific viscosity of from about 0.04 to 0.15, preferably about 0.07 to 0.1, measured as a solution of 0.1 percent of the polymer in dimethylformamide at 25° C.

Styrene and acrylonitrile are presently particularly preferred superstrate monomers. Although the amount of copolymer superstrate grafted onto the rubber substrate may vary from as little as 10 parts by weight per 100 parts of substrate to as much as 250 parts per 100 parts, and even higher, the preferred graft copolymers have a superstrate-substrate ratio of about 30–200:100 and most desirably about 30–100:100 With graft ratios about 30:100, a highly desirable degree of improvements in various properties generally is obtained.

The interpolymer systems used in this invention may be produced by various known polymerization techniques, such as mass, emulsion, suspension and combinations thereof. Whatever polymerization process is employed, the temperature, pressure and catalyst (if used) should be adjusted to control polymerization so as to obtain the desired product interpolymer. If so desired, one or more of the monomers may be added in increments during polymerization for the purpose of controlling viscosity and/or modular weight and/or composition. Moreover, it may be desirable to incorporate lower boiling organic, inert liquid diluents during a mass polymerization reaction to lower the viscosity, particularly when a rubber is employed. Moreover the catalyst may be added to increments, or different catalyst may be added at the same time or at different points during the reaction. For example, when a combined mass-suspension process is employed, generally oil-soluble catalysts may be employed; and both low and high temperatures catalysts may be advantageously used in some reactions.

Mechanical blends may be prepared by simple, conventional physical intermixing of preformed polymers. Conveniently, one used starting materials in a solid, particulate form, and employs such conventional equipment as a ribbon blender, a Henschel mixer, a Waring blender or the like.

Graft copolymers may be prepared, for example, by polymerizing monomers of the interpolymer in the presence of the preformed rubber substrate m generally in accordance with conventional graft polymerization techniques, involving suspension, emulsion or mass polymerization, or combinations thereof. In such graft polymerization reactions, the preformed rubber substrate generally is dissolved in the monomers and this admixture is polymerized to combined chemically or graft at least a portion of the interpolymer upon the rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time. A preferred method of preparation involves carrying out a partial polymerization in a bulk system with the rubber dissolved in a mixture of the ethane monomers and vinyl aromatic monomers, followed by completion of the polymerization in an aqueous suspension system.

Blends may be prepared by blending latices of a graft copolymer and an interpolymer and recovering the polymers from the mixed latices by any suitable means, e.g., drum-drying, spray-drying coagulated, etc. Preferably, they are prepared by simply blending a mixture of the interpolymer and the hydroxylated graft copolymer at an elevated temperature for a period of time sufficient to provide an intimate fusion blend of the polymers. Blends of graft copolymer and copolymer can be prepared by simply blending the two polymers together on conventional plastics working equipment, such as rubber mills, screw-extruders, etc.

A suggested above, the rubber modified interpolymer systems used in this invention contain monovinyl aromatic compound, elastomer, and, optionally at least one other monomer copolymerizable with such monovinyl aromatic compound. In such a system, at least about 2 weight percent of the elastomer present is graft polymerized as a substrate to (as indicated) a superstrate of monovinyl aromatic compound and (optionally and preferably) other monomer polymerizable therewith/ Typically, a small amount of the superstrate interpolymer is not in chemical combination with the rubber substrate because of the less-than-100 percent grafting efficiency of conventional graft copolymerization reactions.

The above-described interpolymer systems are generally well known to the prior art and do not constitute part of the present invention. However, they are to be distinguished from prior art polymer systems such as those of styrene only with no appreciable amounts of elastomer present (sometimes known as homopolystyrene, as opposed to what is known, for example, as a graft copolymer of styrene on a preformed elastomer). Thus, polystyrene characteristically is a brittle, plastic which has a lower softening temperature, and a lower tensile strength at yield than does such a graft copolymer, In addition, homopolystyrene has different solubility characteristics and thermal stability characteristics than do such graft copolymers. It is the superior combination of properties associated with such graft copolymers which is believed to contribute to making them valuable as starting materials in making the surprising and unexpected composites of the present invention.

It will be appreciated than any given matrix layer used in this invention generally comprises at least about 75 weight percent of at least one such rubber modified interpolymer system of monovinyl aromatic compound with the balance up to 100 weight percent thereof being conventional plastic processing adjuvant, organic or inorganic or inorganic fillers, flame retardants, antioxidants, stabilizers, plasticizers, and the like. Besides such 75 weight percent of the interpolymer system, and assuming of course, compatibility with no adverse effect upon the desired end composite properties of improved cold formability and heat resistance, a given matrix layer may also contain a miner percentage, say up to about 15 or 20 weight percent or perhaps somewhat more of another polymer, such as a polyvinyl chloride, a polycarbonate, a polysulfone, a polyphenyleneoxide, a polyamide, or the like, depending upon individual wishes or circumstances, without departing from the spirit and scope of this invention. Fibrous fillers may be used.

Depending on the method of fabricating a sheetlike composite of the present invention, a matrix layer comprising such interpolymer system can be either preformed, or formed in situ around a preformed interlayer. When a matrix layer is preformed, it is conventionally made by the usual extrusion techniques conventionally employed in the plastics industry to make sheets of semirigid solid plastic material.

Starting Materials - Interlayer

Any metal layer having characteristics as above-described can be used as an interlayer in practicing the process of this invention. Such layers are known to the prior art, and can have a variety of physical forms , as those skilled in the art will appreciate, but always have a discontinuous structure.

As used herein, the phrase "generally continuous, generally elongated metal portions" has reference to the fact that in any given metal layer or interlayer the component metal portions thereof are generally continuous and unbroken in at least one direction, taken generally in relation to one face of a matrix layer in a given composite , and also such component metal portions are generally coextensive with such matrix in such direction. Preferably, such component metal portions are generally continuous and unbroken in at least two such direction (more preferably, one such direction being at 90° with respect to the first), and also such portions are generally coextensive with such matrix in such directions. An interlayer by itself is self-supporting (that is, it is not composed of loose, noninterconnected or noncoherent metal portions). The form of an interlayer is generally unimportant; interlayers may be pleated knitted, etc. Considered individually, a metal portion of an interlayer need have no particular cross-sectional configuration or spatial orientation. The spacing between sufficient to per permit the interpolymer system or systems used in a given instance to flow thereinto during the application of heat and pressure to exposed, opposed faces of a composite being made by the teachings of this invention. In any given interlayer of a particular composite, the metal portions are similar in character to one another to enhance uniformity to product characteristics in a finished composite.

Preferably, a given interlayer has the open spaced between such metal portions occuring in a generally regular and recurring pattern. The phase "generally regular and recurring pattern" has reference to the fact that in an interlayer there is a predictable relationship between one relatively subportion thereof and another, as viewed from a face thereof in a macroscopic sense. Such a regular and recurring pattern, ans such continuous, elongated metal portions, in an interlayer are deemed necessary and desirable to obtain the improved cold-formability and heat resistance associated with composite products of this invention. Examples of two classes of metal layers having such a space pattern are woven wire mesh, a perforated sheet metal (including, generically, both perforated expanded metal, and the like). Examples of suitable metals for woven wire mesh and perforated metal include ferrous metals (iron, steel, and alloys thereof), cuprous metals (copper, brass, and allows thereof), aluminum and aluminum alloys, titanium, tantalum nobel metals, and the like.

Another class of interlayers useful in the practicing this invention are those metal layers composed namely of generally randomly arranged, discrete metal filaments which class is sometimes called the metal wools. These filaments may typically have average maximum cross-sectional dimensions ranging from about 5 to 100 mils, and at least about 95 weight percent (based on total interlayer weight) of all such filaments have length to width ratios in excess of about $10^3/1$ (preferably $10^4/1$).

Metal wool is made by shaving thin layers of steel from wire. Typically, the wire is pulled or drawn past cutting tools or through cutting dies which shave off chips or continuous pieces. Steel l wire used for the manufacture of steel wool is of generally high tensile strength and typically contains from about 0.10 to 0.20 percent carbon and from about 0.50 to 1 percent manganese (by weight), from about 0.02 to 0.09 percent sulfur, from about 0.05 to 0.10 percent phosphorous and from about 0.001 to 0.010 percent silicon. Preferably, such wire used as a starting material displays an ultimate tensile strength of not less than about 120,000 pounds per square inch. Metals other than steel are also made into wool by the same processes and when so manufactured have the same general physical characteristics. Thus, metal wools are made from such metals as copper, lead, aluminum, brass, bronze, monel, metal and nickel, and the like. Techniques for the manufacture of metal wools are well known; see, for example, U.S. Pat. Nos 888,123; 2,256,923; 2,492,019; 2,700,811; and 3,050,825.

Commonly, a single filament of a metal wool has three edges, but may have four or five, or even more. In t a given wool, the strands or filaments of various types may be mixed. Finest strands or fibers are commonly no greater than about 0.0005 and the most commonly used type or grade of wool is fibers varying from about 0.002 to 0.004 inch. Commercially, metal wools are classified into seven or nine distinct types or grades. A given metal wool is in the form of a pad or compressed mat of fibers and, as such, is used as an interlayer in composites of this invention. Although the arrangement of fibers in such a pad or mat is generally random, the pad or mat may have imparted thereto a cohesive character by various processes in which groups of fibers are pulled through or twisted with or otherwise mechanically interlocked loosely with other fibers of the whole mat; however, considering the product mat as a whole, the fibers thereof are randomly arranged and in a substantially nonwoven condition.

Still another class of metal layers which may be used in practicing this invention are metal honeycombs such as those conventionally fabricated of aluminum, steel or other metals. Because of structural and rigidity considerations, honeycombs under 150 mils are preferred for use in this invention.

The strength and stiffness of composites of this invention containing honeycomb interlayers are influenced by honeycomb cell shape and size, as well as by the gross thickness and mechanical properties thereof. Increasing honeycomb thickness generally results in higher section modulus and increased moment of inertia for a composite as a whole. In a product composite, shear load orientation should be considered in relationship to the particular use to which it is desired to place a product composite. In general, shear strength and modulus tend to be anisotropic, being influenced by the cell structure of a given honeycomb interlayer; anisotropic shear property differences are particularly noticeable in hexagonal cell honeycomb structures. In general, smaller interlayer cell size and thicker cell walls result in higher compressive strength; however, density increases. Compressive strength in a product composite can be increased by using interlayers having stronger cell walls (for example, by shifting from kraft paper to aluminum, or from 3003 aluminum to 5056 aluminum) without a weight penalty.

Assuming, of course, compatibility, and no adverse effect upon the desired and composite properties of improved cold-formability and heat resistance, a given interlayer may also have as an integral part thereof nonmetallic portions, say up to about 20 weight percent thereof, or somewhat more, but preferably not more than about 10 weight percent thereof, and more preferably not more than about 3 weight percent thereof. Such nonmetallic portions may be applied by dipping, spraying, painting, or the like, and may serve, for example, as electrical insulation, to insulate individual strands one from the other as when an electric current is to be passed through a product composite, or, for another example, as an organic or inorganic coating, over the interlayer to enhance, for instance bonding and adherence between interlayer and matrix layer. Such nonmetallic portions are within the contemplation of this invention and are generally obvious to those skilled in the art as its exist today at the time of the present invention.

It will be appreciated that while an interlayer need not be bonded to the matrix, such is a preferred condition, in general. Observe that an interlayer is fully enclosed by the matrix layer (except possible at extreme edge regions) and that the matrix material always extends between the open spaced in an interlayer in a continuous manner.

The general, it is preferred for purposes of the present invention to preform an interlayer before combining it with matrix layers. The flexibility of the interlayer (that is the ability of an interlayer to be moved transversely in response to a gross force, as compared to a pointed or highly localized force, applied against one face of the interlayer with the end edges of an interlayer sample being positioned in a generally planar configuration) is preferably at least as great as the flexibility of the matrix layer similarly measured but without an interlayer being positioned in such matrix layer.

DESCRIPTION OF THE DRAWINGS

This invention is illustrated by reference to the attached drawings wherein:

FIG. 3 is another diagrammatic view illustrating another embodiments of the process of the present invention and of apparatus suitable for the practice of such process.

Referring to FIG. 1, there is seen illustrated one mode of practicing the process of this invention to make composites. Into the nip region, existing between a pair of heated pressure rollers 14 and 15, it continuously fed a preformed sheet 16 from a supply roll 18 and a preformed sheet 17 from a supply roll 19, both sheets 16 and 17 being composed of a rubber modified polymer system of monovinyl aromatic compound. Each sheet 16 and 17 is preferably preheated, as by infrared heaters 25, or the like. Between sheets 16 and 17 is a fed a wire mesh 20 or other metal interlayer starting material from a supply roll 21. As the assembly of sheet 16, mesh 20, and sheet 17 pass through h the nip region between rollers 14 and 15, the assembly becomes fused together so that sheets 16 and 17 are consolidated into a continuous matrix layer 22 which extends through open spaces in the former mesh 20 which now serves as interlayer 23 in a product composite 24 of this invention.

The completed composite 24 can be stored in a sheetlike form before use. Thus, if thin enough to be in a relatively flexible form, composite 24 can be stored in roll form; if thick enough to be relatively rigid, it can be stored in sheet form, like plywood or heavy gauge sheet metal.

Figure 1:
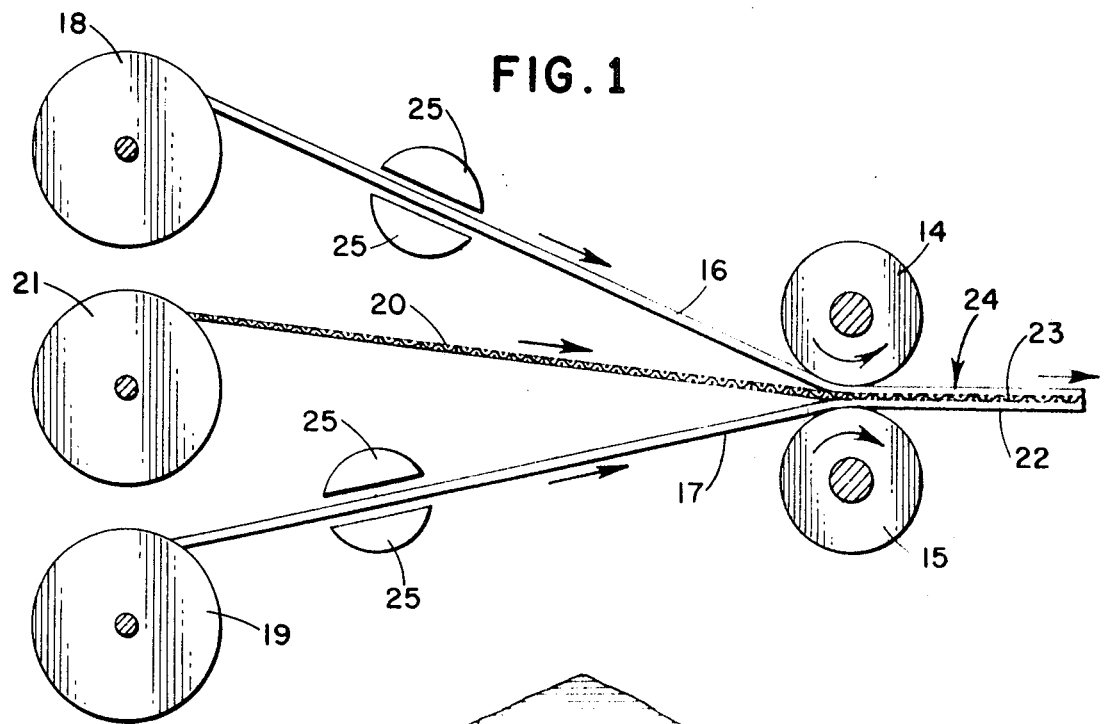
FIG. 1 is a diagrammatic vie illustrating one embodiment of the process of the present invention.
Figure 2:
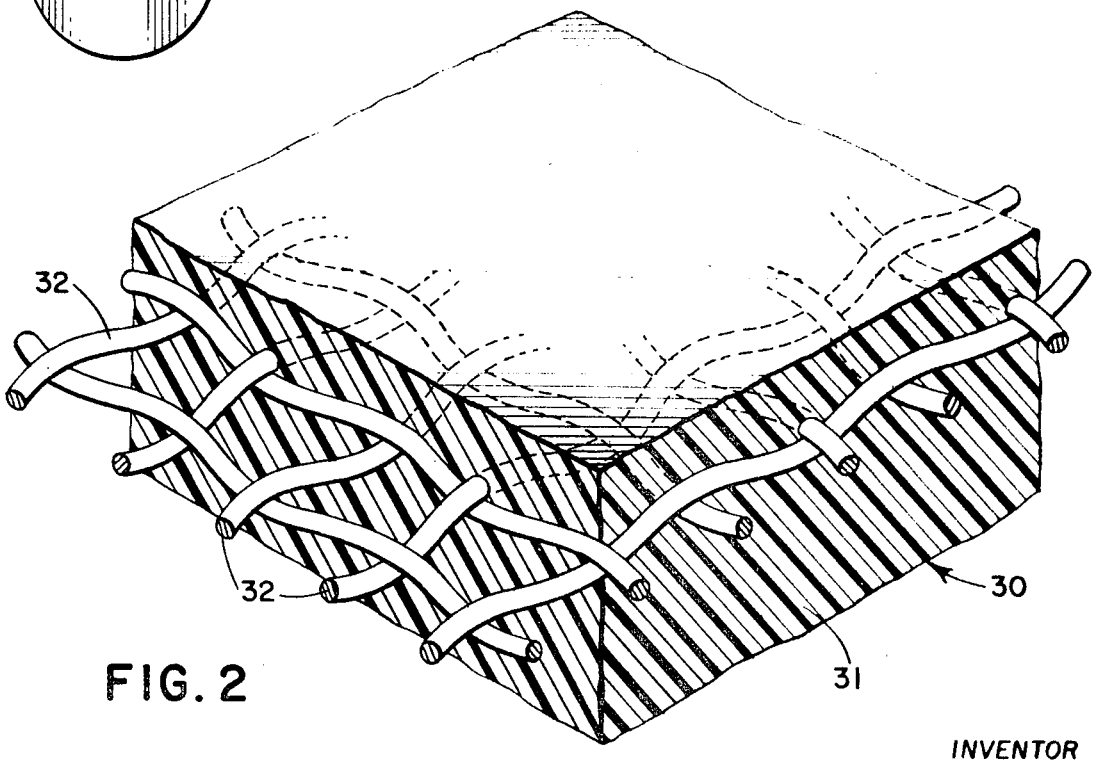
FIG. 2 is a greatly enlarged side elevational view of a portion of the composite produced by the process illustrated in FIG. 1, some parts thereof broken away, and some parts thereof shows in section.

Referring to FIG. 2, there is seen a portion of a composite produced by the process of FIG. 1 which portion is designated in its entirety by the numeral 30. Composite 30 is seen to comprise a matrix layer 31 and an interlayer 32. The interlayer 32 is here a woven wire mesh; the matrix is a rubber modified interpolymer system of monovinyl aromatic compound. The matrix layer through open spaces between the wires.

In general, composites produced by the process of the present invention display excellent thermal resistance, strength, and rigidity characteristics. They also display excellent resistance to environmental thermal stress deterioration. Especially when the interlayer starting material is a wire mesh or metal wool, such produce composites tend to be cold formable. These product composites are useful in a wide variety of situations as metals substitutes, as those skilled in the art will appreciate.

Referring to FIG. 3, there is seen another embodiment of the present invention. Here is employed an apparatus which utilizes such as assembly of coacting components that one can produce the desired composites directly from extrudable pellets (or equivalent) of rubber modified interpolymer system of monovinyl aromatic compound. This apparatus employs three driven, heated pressure rollers, of steel or the like, designated respectively as 36, 37, and 38 which are each of convenient diameter, say, about 12 inches or so. The drive means (not shown) and the heating means (also not shown) are each of conventional design for calendering and mill rolls. Rollers 36, 37, and 38 have axes which are parallel to one another and are so located as to define a nip regions 39 between rollers 36 and 37 and a nip region 46 between rollers 37 and 38.

Mounted in a stationary position in proximity to the nip region, 39 existing between rollers 36 and 37 are a pair of extruder assemblies 41 and 42, respectively. Each such extruder assembly 41 and 42 is adapted continuously to extrude a thermoplastic material in sheet forms 43 and 44, respectively. In addition, each such extruder assembly 41 and 42 is adapted continuously to feed a so-extruded sheet into the nip regions 39, thereby continuously to place the respective sheets 43 and 44 substantially in face-to-face contact with one another. The extruder assemblies 41 and 42 may be of conventional design.

From a supply positions, such as a roll 47, interlayer material 48 is transported by delivery means, such as rollers 49 and 51, to the nip region 39 so as to position interlayer 48 in between respective sheets 43 and 44 at nip region 39. Although extruder assemblies 41 and 42 may optionally also have delivers means (not shown) such are not preferred because of the desire to deliver the sheets 43 and 44 to nip region 39 directly without such heat loss as might cause through contact of sheet 43 and 44 therewith. Observe, however, that roller 36 is used as a guide means for sheet 44 in the embodiments shown as an apparatus convenience in locating equipment components. Sheet 44 is maintained at an elevated temperature by internally heating roller 36 and (optionally) by exterior heaters such as infrared heaters 52. By feeding in the apparatus embodiment shown sheet 43 directly into nip region 39, such auxiliary heating is circumvented.

Interlayer 48 is itself heated by a bank 53 of heaters, such as one of the infrared type or otherwise, and thus arrives at nip region 39 at a suitable elevated temperature. In general, the heating means employed for each of the sheets 43 and 44 and for the inner layer 53 is such that these starting materials are heated to, and maintained at temperatures sufficient to permit the respective sheets 43 and 44 to flow through the discontinuities in interlayer 48 and the fuse together at places of contact into a continuous matrix about the inner layer 48 in the nip region 39.

The apparatus shown in FIG. 3 incorporates an optional feature. Thus, after passing through nip region 39, and now formed composite 54 travels around the surface of roller 37 in an arcuate path into the nip region 46 existing between rollers 37 and 38. Here, the composite 54 is compressed again, but usually only a minor reduction in transverse thickness thereof results. In nip region 46, composite 54 is more fully consolidated into the desired monolithic solid structure, and the exposed, opposed respective surfaces of the composite 54 experience a calendering action from rollers 37 and 38, thereby improving surface properties, such as gloss of the product composite. After leaving the surface of roller 37, the composite 54 is allowed to cool to roomer temperature and is then ready for storage or use, as desired.

If it is desired, extruder 42 can be replaced with a preformed roll (not shown) of an interpolymer system in sheet form, and heating means in roller 36 an by heater 52. Such an apparatus configuration is sometimes desirable, as when one desires to invest in only a single extruder. Those skilled in the art will appreciate that the apparatus shown in FIG. 3 with the addition extruder (not shown) or roll (not shown) of interpolymer system sheet material as well as the addition of a supply of interpolymer (not shown) can be used to make a five-ply composite (that is one having two layers embedded within a single matrix). It is preferred to feed all the starting materials into a common nip region such as 39 in FIG. 3 rather than to progressively add an interlayer and a sheet material at successive nip regions owing primarily to heat transfer considerations.

Other variations within the scope of this invention will be obvious to those of ordinary skill in the art.

Conditions of Fabrication

Using equipment and starting materials as just described in the practice of the present invention, one heats the sheets of interpolymer system and of the interlayer each to temperatures ranging from about 380° to 520° F. Then, the assembly is brought together between pressure rollers to cause consolidation of the sheets of interpolymer system into a solid matrix. Pressures employed vary, like the temperatures used, For given materials, and apparatus, the lower the temperature, the higher the pressure preferred. Broadly, roll pressures typically range from about 25 to 250 lbs./in.$^2$ gauge, but higher and lower temperatures and pressures may be employed without departing from the spirit and scope of this invention. Typical pressure application times range from about 0.1 to 2 seconds. Typical line speeds are in the range of from about 3 to 15 ft./min.

While it is usually convenient and preferred to use preformed interlayers, when one is using honeycomb interlayers, it is sometimes necessary to feed such in noncontinuous sheet form, owing to the relative inflexibility of honeycombs, between continuous sheets of interlayer material. In this event, the product composite itself is usually cut into sheets corresponding approximately to the dimensions of the particular interlayer used.

Embodiments

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples A through D

Sheets in roll form of rubber modified interpolymer systems of monovinyl aromatic compound are prepared by conventional extrusion techniques. The physical characteristics and compositions of each such sheet material are given below in table I.

TABLE I.—MATRIX SHEETS

| Example designation | Sheet thickness, mils[1] | Tensile modulus elasticity, lbs./in.$^2$ at 73° F. | Tensile strength, lbs./in.$^2$ at 73° F. | Tensile elongation, percent at 73° F. | Impact strength, ft.-lbs. falling dart[6] | Composition (Nos. refer to footnotes) |
|---|---|---|---|---|---|---|
| A | 35 | 300,000 | 5,100 | 40 | 110 | [2] |
| B | 60 | 330,000 | 6,300 | 20 | 25 | [3] |
| C | 60 | 370,000 | 7,000 | 28 | 20 | [4] |
| D | 30 | 220,000 | 2,200 | 40 | 22 | [5] |

TABLE I FOOTNOTES (1) 1 mil equals 0.001 inch.

(2) A graft copolymer of 82 weight percent styrene/acrylonitrile copolymer superstrate on 18 weight percent butadiene elastomer substrate made according to teachings of U.S. Pat. No. 3,328,488

(3) A graft copolymer found by analysis to contain about 80 to 85 weight percent styrene/acrylonitrile copolymer superstrate on about 15 to 20 weight percent polyalkyl acrylate ester elastomer substrate available commercially under the trade designation "Luran-S"for M Badische Anilin and Soda FFabrik, West Germany (4) A graft copolymer found by analysis to contain styrene/acrylonitrile/ methylmethacrylate terpolymer on a polybutadiene elastomer substrate available commercially u under the trade designation "XT" from the American Cyanamid Company and preparable by the teachings U.S. Pat. No. 3,354,238

(5) A mixture of homopolystyrene and a graft copolymer of styrene polymer superstrate on a butadine substrate containing 92 ½weight percent styrene and 7 ½weight percent butadine, the graft copolymer therein having been prepared by the teachings of U.S. Pat. NO. 3,44,279

(6) Corrected to 0.100-inch thickness basis.

Examples E through J

Continuous test lengths of metal interlayers are prepared, the characteristics and composition of each being as summarized in tables IIA, IIB, IIC, and IID, below

TABLE IIA.—WOVEN WIRE MESH INTERLAYERS

| Example designation | Mesh thickness, mils | Tensile modulus elasticity, lbs./in.$^2$ at 73° F. | Tensile strength, lbs./in.$^2$ at 73° F. | Tensile elongation, percent at 73° F. | Type metal used in mesh | Wire gauge, in. | Mesh size |
|---|---|---|---|---|---|---|---|
| E | 22 | 30×10$^6$ | 81,500 | 3 | Galvanized steel | .011 | 13 |
| F | 20 | 10×10$^6$ | 35,800 | 10 | Aluminum | .010 | 16 |
| G | 18 | 25×10$^6$ | 98,200 | 40 | Stainless steel | .009 | 18 |

TABLE IIB.—PERFORATED SHEET METAL INTERLAYER

| Example designation | Sheet thickness, mils | Tensile modulus elasticity, lbs./in.$^2$ at 73° F. | Tensile strength, lbs./in.$^2$ at 73° F. | Tensile elongation, percent at 73° F. | Type metal in sheet | Number of holes, avg. In sheet per sq. in. | Individual hole size, in |
|---|---|---|---|---|---|---|---|
| H | 16 | 16×10$^6$ | 70×10$^3$ | 20 | Brass | 169 | 0.050 |

TABLE IIC.—METAL WOOL INTERLAYER

| Example designation | Interlayer thickness (inches measured in air under no load) | Avg. max. individual fiber cross-sectional dimension, inches | Type metal | Apparent length-to-width ratio of more than 95 weight percent |
|---|---|---|---|---|
| I | 0.25 | .002 to .004 | Steel [1] | In excess 10³/1 |

[1] Made from steel wire having an ultimate tensile strength over 120,000 pounds per square inch and believed to contain from about 0.10 to 0.20 percent carbon, from about 0.50 to 1 percent manganese, and from about 0.02 to 0.09 percent sulphur.

TABLE IID.—HONEYCOMB INTERLAYER

| Example designation | Honeycomb material | Transverse thickness, inches | Width-height ratio of solid material portions | Geometric shape of open spaces in honeycomb | Cell size, in. | Core density, lbs./ft.$_3$ |
|---|---|---|---|---|---|---|
| J | 3003 alloy aluminum | .015 | <1 | Hexagonal | ⅛ | 3.1 |

Examples 1 through 6

Using the foregoing sheets of rubber modified interpolymer system of monovinyl aromatic compound and the foregoing interlayer materials, composites are continuously prepared. Apparatus similar to that described above in reference to FIG. 3 is employed, except that extruder 42 is replaced with a preformed roll of interpolymer system in sheet form.

Velocity of the composite over roller 37 is about 4 feet per minute. The plastic sheet members each enter the roll nip at a temperature of about 300° F.; pressure is estimated to be in the range of about 90 p.s.i. in nip 39 and to be in the range of about 50 p.s.i.

A sample of each product composite of examples 1–3 is formed on a metal drawing press using a 6-inch diameter tool. The cold forming results obtained are recorded in table III below the show cold-formability even though die clearances, lubricants, and male punch radii were not optimum. Gardner Impact, and tensile strength tests are also performed on each sample. Each sample also displays excellent thermal stability. Similar results are observed for the samples of the product of examples 4–6.

Results are shown in table III below.

TABLE III.—COMPOSITES

| | Matrix layer | | Interlayer | | | |
|---|---|---|---|---|---|---|
| Example number | Type (Table I) | Total transverse average thickness, inches (est.) | Type (Table II) | Percent transverse average thickness of whole composite (est.) | Tensile modulus of elasticity, lbs./in.²×10⁵ | Cold-formability |
| Control | A | .070 | None | 0 | 3.08 | Poorly. |
| 1 | A | .070 | E | 31 | 6.91 | Yes. |
| 2 | A | .070 | F | 29 | 4.55 | Yes. |
| 3 | A | .070 | G | 26 | 4.63 | Yes. |
| 4 | B | .118 | H | 13.5 | | Yes. |
| 5 | C | .120 | I | 25 | | Yes. |
| 6 | D | .060 | J | 25 | | Yes. |

EXAMPLE 7

Using an apparatus similar to that described above in reference to example 3, but modified so as to contain in place of extruder 42, two preformed rolls of interpolymer system in sheet form as well as an additional roll of interlayer material so mounted as to feed interlayer material between the sheets of interpolymer system from the foregoing two rolls. The angle of feed of all three sheets of interpolymer system into the nip region 39 is adjusted so as to provide minimal contact between interlayers and interpolymer system sheet members prior to the time the assembly comes together at the nip region 39. Auxiliary guide means and associated heating elements are used to accomplish this end. The plastic sheet member used is like that of example A above and the interlayer is like that of example E in each instances. Pressure, temperature, and velocity conditions are similar to those employed in examples 1–6 above. The result is a composite containing two interlayers spaced from one another by a solid matrix of monovinyl aromatic compound in sheet form.

What is claimed is:

1. A continuous process for preparing a sheetlike composite having a matrix layer and an interlayer embedded therein, said process comprising the steps of:
    A. separately heating each of two preformed continuously moving, continuously extending sheets of a rubber-modified interpolymer system of monovinyl aromatic compound and being characterized by having:
        1. a transverse average thickness ranging from about 0.007 inch to 0.250 inch,
        2. a tensile modulus of elasticity of from about 150,000 to 600,000 pounds per square inch at 73° F.,
        3. a tensile elongation to fail of at least about 5 percent at 73° F.,
        4. an impact strength of from about 15 to 200 ft.-lbs. falling dart (at 0.1-inch thickness and 73° F.),
    B. separately heating to temperatures in the same range a preformed continuously moving, continuously extending discontinuous layer comprising metal and characterized by having:
        1. a transverse average thickness ranging from about 1 to 85 percent of the total combined average thickness of said sheets,
        2. generally continuous, generally elongated metal portions with open spaces defined therebetween, the interrelationship between such metal portions and such open spaces being such that from about 5 to 70 weight percent of such interlayer comprises metal,
    C. continuously bringing together said two sheets into face-to-face engagement with one another with said layer interposed therebetween while simultaneously continuously applying to the opposed respective exposed faces of said sheets sufficient pressure to cause the material comprising said sheets to flow into and through said layer and coalesce together at points to contact with one another, thereby to form the desired matrix layer with the desired interlayer embedded therewithin.

2. The process of claim 1 wherein the interlayer is a woven wire mesh.

3. A continuous process for preparing a sheetlike composite having a matrix layer and an interlayer embedded therein, said process comprising the steps of:
    A. separately heating each of two preformed continuously moving, continuously extending sheets of a graft copolymer of styrene and acrylonitrile on a preformed elastomer and being characterized by having:
        1. a transverse average thickness ranging from about 0.007 inch to 0.250 inch, 2. a tensile modulus of elasticity of from about 150,000 to 600,000 pounds per square inch at 73° F.,
3. a tensile elongation to fail of at least about 5 percent at 73° F.,
4. an impact strength of from about 15 to 200 ft.-lbs. falling dart (at 0.1 inch thickness and 73° F.), B. separately heating to temperatures in the same range a preformed continuously moving, continuously extending woven wire mesh characterized by:
1. having a transverse average thickness ranging from about 1 to 85 percent of the total combined average thickness of said sheets,
2. containing from about 5 to 70 weight percent of metal, C. continuously bringing together said two sheets into face-to-face engagement with one another with said layer interposed therebetween while simultaneously continuously applying to the opposed respective exposed faces of said sheets sufficient pressure to cause the material comprising said sheets to flow into and through said layer and coalesce together at points of contact with one another, thereby to form the desired matrix layer with the desired interlayer embedded therewithin.

4. A continuous process for preparing a sheetlike composite having a matrix layer and an interlayer embedded therein, said process comprising the steps of:
A. separately heating each of at least two preformed continuously moving, continuously extending sheets of a rubber-modified interpolymer system of monovinyl aromatic compound and being characterized by having:
1. a transverse average thickness ranging from about 0.007 inch to 0.250 inch,
2. a tensile modulus of elasticity of from about 150,000 to 600,000 pounds per square inch at 73° F.,
3. a tensile elongation to fail of at least about 5 percent at 73° F.,
4. an impact strength of from about 15 to 200 ft.-lbs. falling dart (at 0.1-inch thickness and 73° F.), B. separately heating to temperatures in the same range at least one preformed continuously moving, continuously extending discontinuous layer comprising metal, each such layer being characterized by having:
1. a transverse average thickness ranging from about 1 to 85 percent of the total combined average thickness of said sheets,
2. generally continuous, generally elongated metal portions with open spaces defined therebetween the interrelationship between such metal portions and such open spaces being such that from about 5 to 70 weight percent of such interlayer comprises metal, there being one less such continuous layer than the total of said sheets, C. continuously interposing one of said layers between each pair of adjacent sheets while simultaneously continuously applying to the opposed respective exposed faces of said sheets sufficient pressure to cause the material comprising said sheets to flow into and through each of said layers and coalesce together at points of contact with one another, thereby to form the desired matrix with each of the interlayers embedded therewithin.

* * * * *